United States Patent [19]

Walz et al.

[11] Patent Number: 5,624,626
[45] Date of Patent: Apr. 29, 1997

[54] METHOD OF TREATING A CERAMIC BODY TO FORM A WETTABLE SURFACE

[76] Inventors: Thomas J. Walz, 416 Columbia Ave., Fircrest, Wash. 98466; Issak S. Rossovsky, 12509 35th Ave. NE. #108, Seattle, Wash. 98125

[21] Appl. No.: 475,358

[22] Filed: Jun. 7, 1995

[51] Int. Cl.$^6$ ........................................ B06B 1/02
[52] U.S. Cl. .................... 264/430; 205/103; 205/170; 205/647; 205/665; 205/674; 205/681; 205/687; 205/710; 205/711; 205/720; 205/723
[58] Field of Search .................. 264/430; 205/665, 205/674, 681, 687, 710, 711, 723, 103, 170, 647, 720

[56] References Cited

U.S. PATENT DOCUMENTS

| | | | |
|---|---|---|---|
| 1,917,022 | 7/1933 | Dunn. | |
| 2,451,341 | 10/1948 | Jernstedt | 204/44 |
| 2,685,564 | 8/1954 | Emmett, Jr. et al. | 204/145 |
| 2,798,843 | 7/1957 | Slomin et al. | 204/32 |
| 2,905,605 | 9/1959 | Keeleric et al. | 204/143 |
| 2,979,811 | 4/1961 | Toney | 29/182.7 |
| 3,078,219 | 2/1963 | Chang | 205/674 |
| 4,851,093 | 7/1989 | Routsis | 204/146 |
| 5,227,034 | 7/1993 | Stein et al. | 205/674 |

OTHER PUBLICATIONS

Hawley, Gessner. The Condensed Chemical Dictionary, Tenth Ed., "Tungsten Carbide", p. 1062 1981.

Metallography Principles and Practice, by George F. Vander Voort, Appendix H, p. 599.

Brazing Handbook, Fourth Edition, pp. 386, 411, 412, 414 and 416.

Handbook of Chemistry and Physics, 74th Edition, 1993–1994, pp. 4–18, 4–54, and 4–109.

Materials Science and Engineering Series, Vander Voort Metallography Principles and Practice, Appendix H, p. 599 and Appendix I, p. 711.

Introduction to Materials Science For Engineers, Second Edition, by James F. Shackelford, p. 357.

Materials Handbook, Thirteenth Edition, by George S. Brady et al., pp. 180–184.

Ajax Reprint No. 189A, Reprinted from Machinery, entitled Methods for automating salt bath heat treating and quenching operations.

*Primary Examiner*—Donald E. Czaja
*Assistant Examiner*—Michael Philip Colaianni
*Attorney, Agent, or Firm*—Teresa J. Wiant

[57] ABSTRACT

The present invention provides a method for treating a ceramic body to provide a wettable surface on the ceramic body. According to the present invention, a ceramic body is immersed in an alkaline hydroxide solution. The ceramic body is connected to form the anode and a suitable metal is connected to form the cathode of an electrolytic cell. A difference in electrical potential is imposed across the electrolytic cell which is sufficient to remove portions of the ceramic body to provide a pitted surface on the ceramic body which is wettable.

19 Claims, No Drawings

METHOD OF TREATING A CERAMIC BODY TO FORM A WETTABLE SURFACE

TECHNICAL FIELD

This invention relates to a method for treating a ceramic body, and more particularly, to a method of treating a ceramic body, such as a cemented carbide body, to provide a wettable surface on the ceramic body.

BACKGROUND INFORMATION

Toney U.S. Pat. No. 2,979,811 discloses a method for providing a wettable surface on a cemented carbide body by immersing the cemented carbide body in a barium chloride salt bath at temperatures between 1950° and 2250° F. However, use of the disclosed method requires workers to operate high temperature furnaces. In addition, use of the disclosed method requires disposal of barium salts.

DISCLOSURE OF THE INVENTION

The present invention provides a method for treating a ceramic body to form a wettable surface on the ceramic body. The method includes immersing the ceramic body in an alkaline hydroxide solution bath and connecting the ceramic body to form the anode and a suitable metal to form the cathode of an electrolytic cell. Then, a difference in electrical potential is imposed across the electrolytic cell sufficient to remove portions of the ceramic body to provide a pitted surface on the ceramic body which is wettable. Then, the ceramic body is removed from the alkaline hydroxide solution bath.

In a preferred form of the invention, the method further includes connecting the ceramic body to form the cathode and a suitable metal to form the anode of the electrolytic cell. Then, a difference in electrical potential is imposed across the electrolytic cell sufficient to remove substantially all contaminants from the surface of the ceramic body. Preferably, the ceramic body is connected to form the cathode of the electrolytic cell before the ceramic body is connected to form the anode of the electrolytic cell.

When an electrical potential is imposed across the electrolytic cell, it is preferred that the electrical potential is between about two (2) volts and about fifteen (15) volts. In a more preferred form of the invention, the electrical potential is between about five (5) volts and about ten (10) volts. In an even more preferred form of the invention, the electrical potential is about six (6) volts. It is also preferred that when the difference in electrical potential is imposed across the electrolytic cell, the ceramic body is exposed to the difference in electrical potential in the alkaline hydroxide solution bath for between about one (1) minute and about five (5) minutes. In a more preferred form of the invention, the ceramic body is exposed to the difference in electrical potential in the alkaline hydroxide solution bath for between about two (2) minutes and about three (3) minutes.

In another form of the invention, the ceramic body is then immersed in a metallic acid for a time sufficient to inhibit oxidation of the ceramic body. The metallic acid may comprise a strong acid and Chromium Trioxide.

Preferably, the alkaline hydroxide solution bath comprises sodium hydroxide. The method of the present invention is particularly useful for treating a cemented carbide body, particularly, a tungsten carbide body.

These and other advantages and features will become apparent from the detailed description of the best mode for carrying out the invention that follows.

BEST MODE FOR CARRYING OUT THE INVENTION

The present invention provides a method for treating a ceramic body to form a wettable surface on the ceramic body. The treated surface of the ceramic body is wettable meaning that it has a porous, rough, clean surface over which brazing compounds or other liquids, such as paint as well as other platings and coatings, will flow. According to the present invention, a wettable surface is formed on a ceramic body by removing carbonized oils, free carbon, iron oxide, and metal particles. In addition, the present invention provides a wettable surface by creating pitting in the surface of the ceramic body.

According to the method of the present invention, a ceramic body is immersed in a bath and connected to form the anode of an electrolytic cell. A suitable metal is connected as the cathode of the electrolytic cell. The bath includes an alkaline hydroxide solution. A difference in electrical potential is imposed across the electrolytic cell. The electrical potential is of a sufficient magnitude and is imposed for a time sufficient to remove portions of the ceramic body such that pitting is formed in the surface of the ceramic body. Pitting in the surface of the ceramic body enables the surface to be wetted by a liquid, such as a brazing compound. Then, the ceramic carbide body is removed from the bath.

The magnitude of the electrical potential difference should be sufficient to remove portions of the ceramic body such as to form a wettable surface on the ceramic body. The preferred electrical potential difference may vary depending upon the composition of the ceramic body, the amount of time that the ceramic body is in the bath, and the composition of the solution in the bath. In general, as the concentration of the alkaline hydroxide solution increases, the magnitude of the electrical potential difference may be decreased. Also, as the elapsed time that the electrical potential difference is imposed across the electrolytic cell increases, the magnitude of the electrical potential difference may be decreased.

For most application, the difference in electrical potential imposed across the electrolytic cell may be between about two (2) volts and about fifteen (15) volts. In a more preferred form of the invention, the difference in electrical potential is between about five (5) volts and about ten (10) volts. And, in an even more preferred form of the invention, the electrical potential difference is about six (6) volts.

Similarly, the elapsed time that the ceramic body is treated to the electrical potential difference should be sufficient to remove portions of the ceramic body such as to form a wettable surface on the ceramic body. The preferred elapsed time may vary depending upon the composition of the ceramic body, the magnitude of the electrical potential difference, and the composition of the solution in the bath. However, for most applications, the elapsed time in which the electrical potential difference is imposed across the electrolytic cell may be between about one (1) minute and about five (5) minutes. In a more preferred form of the invention, the elapsed time is between about two (2) minutes and about three (3) minutes.

Preferably, the alkaline hydroxide solution includes a 10 to 15 percent by volume (10–15 g/100 ml) sodium hydroxide solution. However, other alkaline hydroxide solutions, such as potassium hydroxide, may be used in the method of the present invention.

An advantage of the present invention is that the bath need not be operated at high temperatures. For example, good results are obtained when the alkaline hydroxide solution bath is initially at room temperature, approximately 70° F., when the ceramic body is immersed in the bath. Additional heating or cooling need not be added to the bath during operation of the method of the present invention.

In a more preferred form of the invention, the ceramic body is first immersed in the alkaline hydroxide solution bath and connected to form the cathode and the suitable metal connected to form the anode of the electrolytic cell. A difference in electrical potential is imposed across the electrolytic cell. The electrical potential is of a sufficient magnitude and is imposed for a sufficient time to decompose portions of the ceramic body such that a small amount of pitting is formed in the surface of the ceramic body. In addition, contaminants, such as carbonized oils, free carbon, iron oxide, and metal particles, are removed from the surface of the ceramic body.

The magnitude of the electrical potential difference should be sufficient to pretreat the ceramic body for use in the method of the present invention. The pretreatment involves removing substantially all contaminants from the surface of the ceramic body as well as creating some pitting in the surface of the ceramic body. The preferred electrical potential difference may vary depending upon the composition of the ceramic body, the amount of time that the ceramic body is in the bath, and the composition of the solution in the bath. However, for most applications, the difference in electrical potential imposed across the electrolytic cell may be between about two (2) volts and about fifteen (15) volts. In a more preferred form of the invention, the difference in electrical potential is between about five (5) volts and about ten (10) volts. And, in an even more preferred form of the invention, the electrical potential difference is about six (6) volts.

Similarly, the elapsed time that the ceramic body is treated to the electrical potential difference should be sufficient to pretreat the ceramic body for use in the method of the present invention. The preferred elapsed time may vary depending upon the composition of the ceramic body, the magnitude of the electrical potential difference, and the composition of the solution in the bath. However, for most applications, the elapsed time in which the electrical potential difference is imposed across the electrolytic cell may be between about one (1) minute and about five (5) minutes. In a more preferred form of the invention, the elapsed time is between about two (2) minutes and about three (3) minutes.

According to this preferred method, after being pretreated the polarity of the electrolytic cell is reversed and the ceramic body is treated as described above to form pitting in the surface of the ceramic body.

It is preferred that after being removed from the bath, the ceramic body is rinsed with water and allowed to air dry. Generally, the ceramic body is dark gray after it has dried.

It is also preferred that the ceramic body is then immersed in a passivation solution comprising a metallic acid. The metallic acid may be formed from a strong acid, such as hydrochloric acid, and a metal, such as chromium trioxide. The ceramic body is immersed in the passivation solution for a time sufficient to passivate the ceramic body such that oxidation of the surface of the ceramic body is inhibited. Generally, the ceramic body is light gray after being removed from the passivation solution.

In a preferred form of the invention, the passivation solution is prepared with about 80 ml of hydrochloric acid, 100 ml of water and 1 gram of chromium trioxide. Preferably, the passivation solution is at room temperature, approximately 70° F., when the ceramic body is immersed in it. After the ceramic body has been removed from the passivation bath, the ceramic body may be rinsed with water and allowed to air dry.

At this point, the ceramic body is treated such that it includes a wettable surface. The ceramic body may then be subjected to further processing.

The method of the present invention is particularly useful for treating a cemented carbide body, such as a tungsten carbide body in a cobalt matrix to provide a surface on the tungsten carbide body which is wettable by a silver brazing alloy. When silver brazing alloy is applied to the surface of an untreated tungsten carbide body, the brazing alloy forms a globule on the surface instead of flowing evenly and completely across the surface. Joints formed by a globule of alloy are generally not as uniformly strong for most industrial applications, such as adhering a tungsten carbide tip to a circular saw plate. The present invention provides a treated surface on a tungsten carbide saw tip which is readily wettable by a silver brazing alloy compound. The brazing compound flows evenly and completely across the surface of the tip such that a uniformly strong joint is formed between the tungsten carbide tip and the circular saw plate. In addition, a body treated according to the method of the present invention remains clean and wettable such that the body may be stored and processed at a later time.

The nature and substance of the instant invention as well as its objects and advantages will be more clearly understood by referring to the following specific examples.

EXAMPLE 1

Five saw tips composed of cemented composites of tungsten carbide-cobalt for use on a circular saw plate are obtained. Upon visual inspection, the surfaces of the tips are relatively free of pitting and include some contaminants, such as carbonized oils, free carbon, iron oxide, and metal particles. The saw tips are immersed in a bath of a 15 percent by volume sodium hydroxide solution and connected as a cathode in an electrolytic cell. Stainless steel is connected as an anode. The sodium hydroxide bath is maintained at room temperature, approximately 70° F. Six (6) volts are imposed across the electrolytic cell for two (2) minutes. The tips are removed from the bath. Upon microscopic inspection (1000X), a few pits have been formed in the surface of the tips. In addition, the surfaces of the tips are substantially free of contaminants.

EXAMPLE 2

Example 1 is repeated, except that the tips are not removed from the bath, but instead the polarity of the electrolytic cell is reversed by connecting the tips as an anode and the stainless steel as a cathode of the electrolytic cell. Then, six (6) volts of electrical potential difference is imposed across the cell for two (2) minutes. Then, the tips are removed from the bath. Upon microscopic inspection, substantial pitting is formed on the surface of the tips. Then, silver solder is applied to a surface of each tip. The solder flows smoothly across the surface to cover the surface. The saw tips are adhered by the solder to a circular saw plate. The joint between each saw tip and the circular saw plate is strong.

EXAMPLE 3

Examples 1 and 2 are repeated except that solder is not applied to the tips. The tips are then rinsed in water and allowed to air dry. Upon visual inspection, the tips are dark gray.

EXAMPLE 4

The tips from Example 3 are immersed in a metal acid solution for approximately 10 seconds. The metal acid solution is composed of about 80 ml Hydrochloric acid, 100 ml water and 1 gram Chromium Trioxide. The tips are light gray.

EXAMPLE 5

The tips from Example 4 are rinsed in water and allowed to air dry. Then, silver solder is applied to a surface of each tip. The solder flows smoothly across the surface to cover the surface. The saw tips are adhered by the solder to a circular saw plate. The joint between each saw tip and the circular saw plate is strong. Upon visual inspection two weeks after the tips have been treated according to the method of the present invention, the tips have not discolored.

EXAMPLE 6

Examples 1–5 are repeated, eliminating the steps set forth in Example 1. Then, silver solder is applied to a surface of each tip. The silver solder flows across the surface of the tips, but without complete coverage. The saw tips are adhered by the solder to the circular saw plate. The joint between each saw tip and the circular saw plate is somewhat strong, but not as strong as the joint in Example 5. Upon visual inspection two weeks after the tips have been treated according to the method of the present invention, the tips have not discolored.

EXAMPLE 7

Examples 1–5 are repeated with three (3) volts imposed across the electrolytic cell for three (3) minutes in the step set forth in Example 1. Then, silver solder is applied to a surface of each tip. The solder flows smoothly across the surface to cover the surface. The saw tips are adhered by the solder to the circular saw plate. The joint between each saw tip and the circular saw plate is strong. Upon visual inspection two weeks after the tips have been treated according to the method of the present invention, the tips have not discolored.

EXAMPLE 8

Examples 1–5 are repeated with three (3) volts imposed across the electrolytic cell for three (3) minutes in the step set forth in Example 2. Then, silver solder is applied to a surface of each tip. The solder flows smoothly across the surface to cover the surface. The saw tips are adhered by the solder to the circular saw plate. The joint between each saw tip and the circular saw plate is strong. Upon visual inspection two weeks after the tips have been treated according to the method of the present invention, the tips have not discolored.

EXAMPLE 9

Examples 1–5 are repeated with a 10 percent by volume sodium hydroxide solution used in the steps set forth in Example 1 and Example 2. Then, silver solder is applied to a surface of each tip. The solder flows smoothly across the surface to cover the surface. The saw tips are adhered by the solder to the circular saw plate. The joint between each saw tip and the circular saw plate is strong. Upon visual inspection two weeks after the tips have been treated according to the method of the present invention, the tips have not discolored.

EXAMPLE 10

Examples 1–5 are repeated with a 10 percent by volume potassium hydroxide solution instead of sodium hydroxide solution used in the steps set forth in Example 1 and Example 2. The tips are a bit more brown than the tips treated with the sodium hydroxide solution. Then, silver solder is applied to a surface of each tip. The solder flows smoothly across the surface to cover the surface. The saw tips are adhered by the solder to a circular saw plate. The joint between each saw tip and the circular saw plate is strong. Upon visual inspection two weeks after the tips have been treated according to the method of the present invention, the tips have not discolored.

EXAMPLE 11

Examples 1–5 are repeated. Two weeks later, silver solder is applied to a surface of each tip. The solder flows smoothly across the surface to cover the surface. The saw tips are adhered by the solder to the circular saw plate. The joint between each saw tip and the circular saw plate is strong. In addition, the tips have not discolored.

EXAMPLE 12

Five saw tips composed of cemented composites of tungsten carbide-cobalt for use on a circular saw plate are obtained. Upon microscopic inspection, the surfaces of the tips are relatively free of pitting and include some contaminants, such as carbonized oils, free carbon, iron oxide, and metal particles. Silver solder is applied to a surface of each saw tip. The solder does not flow smoothly across the surface of each saw tip, but instead a globule of solder is formed on each saw tip. The saw tips are adhered by the solder to the circular saw plate. Some of the joints between the saw tips and the circular saw plate are weaker than the joints formed with the tips treated according to the method of the present invention.

What is claimed is:

1. A method for treating a ceramic body to provide a wettable surface on the ceramic body, comprising:

immersing the ceramic body in an alkaline hydroxide solution bath;

connecting the ceramic body to form an anode of an electrolytic cell;

connecting a stainless steel object to form a cathode of the electrolytic cell;

imposing a difference in electrical potential across the electrolytic cell sufficient to remove portions of the ceramic body to provide a pitted surface on the ceramic body which is wettable; and removing the ceramic body from the alkaline hydroxide solution bath.

2. The method of claim 1, further including connecting the ceramic body to form a cathode and the stainless steel object to form an anode of the electrolytic cell and imposing a difference in electrical potential across the electrolytic cell sufficient to remove substantially all contaminants from the surface of the ceramic body.

3. A method for treating a ceramic body to provide a wettable surface on the ceramic body, comprising:

immersing the ceramic body in an alkaline hydroxide solution bath;

connecting the ceramic body to form an anode of an electrolytic cell; connecting a stainless steel object to form a cathode of the electrolytic cell;

imposing a difference in electrical potential across the electrolytic cell sufficient to remove portions of the ceramic body to provide a pitted surface on the ceramic body which is wettable;

connecting the ceramic body to form a cathode and the stainless steel object to form an anode of the electrolytic cell and imposing a difference in electrical potential across the electrolytic cell sufficient to remove substantially all contaminants from the surface of the ceramic body; and removing the ceramic body from the alkaline hydroxide solution bath;

wherein the ceramic body is connected to form the cathode of the electrolytic cell before the ceramic body is connected to form the anode of the electrolytic cell.

4. The method of claim 1, wherein the alkaline hydroxide solution bath comprises sodium hydroxide.

5. The method of claim 1, wherein the alkaline hydroxide solution comprises potassium hydroxide.

6. The method of claim 1, wherein the difference in electrical potential is between about 2 volts and about 15 volts.

7. The method of claim 6, wherein the difference in electrical potential is between about 5 volts and about 10 volts.

8. The method of claim 7, wherein the difference in electrical potential is about 6 volts.

9. The method of claim 1, wherein the ceramic body is exposed to the difference in electrical potential in the alkaline hydroxide solution bath for between about 1 minute and about 5 minutes.

10. The method of claim 9, wherein the ceramic body is exposed to the difference in electrical potential in the alkaline hydroxide solution bath for between about 2 minutes and about 3 minutes.

11. The method of claim 2, wherein the difference in electrical potential is between about 2 volts and about 15 volts.

12. The method of claim 11, wherein the difference in electrical potential is between about 5 volts and about 10 volts.

13. The method of claim 12, wherein the difference in electrical potential is about 6 volts.

14. The method of claim 2, wherein the ceramic body is exposed to the difference in electrical potential in the alkaline hydroxide solution bath for between about 1 minute and about 5 minutes to remove contaminants.

15. The method of claim 14, wherein the ceramic body is exposed to the difference in electrical potential in the alkaline hydroxide solution bath for between about 2 minutes and about 3 minutes.

16. The method of claim 1, wherein the ceramic body is cemented carbide.

17. The method of claim 16, wherein the ceramic body is tungsten carbide.

18. The method of claim 1, wherein the ceramic body is immersed in a metallic acid for a time sufficient to inhibit oxidation of the ceramic body.

19. The method of claim 18, wherein the metallic acid comprises a strong acid and Chromium Trioxide.

* * * * *